(12) United States Patent
Kojima et al.

(10) Patent No.: US 8,380,028 B2
(45) Date of Patent: Feb. 19, 2013

(54) COMPOSITE CABLE

(75) Inventors: Seiji Kojima, Hitachi (JP); Kanako Suzuki, Hitachi (JP); Yoshikazu Namekawa, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 324 days.

(21) Appl. No.: 12/781,130

(22) Filed: May 17, 2010

(65) Prior Publication Data

US 2010/0290748 A1 Nov. 18, 2010

(30) Foreign Application Priority Data

May 18, 2009 (JP) ................................. 2009-119594
May 22, 2009 (JP) ................................. 2009-124345

(51) Int. Cl.
*G02B 6/44* (2006.01)

(52) U.S. Cl. ........................ 385/101; 385/114; 174/70 R

(58) Field of Classification Search .......... 385/100–114; 174/70 R

See application file for complete search history.

(56) References Cited

U.S. PATENT DOCUMENTS

| | | | | |
|---|---|---|---|---|
| 4,826,279 A | * | 5/1989 | Nishimura et al. | ........... 385/102 |
| 7,065,604 B2 | * | 6/2006 | Konda et al. | ................... 710/315 |
| 2006/0246772 A1 | * | 11/2006 | Yamaguchi et al. | .......... 439/505 |
| 2006/0269198 A1 | * | 11/2006 | Blazer et al. | .................. 385/100 |

FOREIGN PATENT DOCUMENTS

JP 2006-310197 11/2006

* cited by examiner

*Primary Examiner* — Ellen Kim
(74) *Attorney, Agent, or Firm* — Brundidge & Stanger, P.C.

(57) ABSTRACT

A composite cable that is able to prevent both the unfastening of the cable end from the connector and the occurrence of the bending distortion of the optical fiber, to both of which the expansion and shrinkage of the overall sheath is responsible, is provided. The composite cable comprises a stranded wire that is a strand of a plurality of insulated conductors each of which is a conductor with insulation covering thereon, an optical fiber ribbon that has a plurality of optical fibers parallelly-arranged in a row, and an overall sheath that covers the stranded wire and the optical fiber ribbon in a bundle, wherein the composite cable has a deterrent positioned on outer side of the stranded wire and the optical fiber ribbon parallelly-arranged in a row along the width direction of the overall sheath for deterring expansion and shrinkage of the overall sheath. Further, the composite cable has a bonding jacket between the deterrent and the overall sheath for making the deterrent adhere to the overall sheath; alternatively, the deterrent has a patterned indented shape on the surface thereof for making the deterrent adhere to the overall sheath.

11 Claims, 14 Drawing Sheets

(a)

(b)

(a)

(b)

(a)

(b)

COMPOSITE CABLE

TECHNICAL FIELD

The present invention relates to a composite cable comprised of a plurality of metallic wires and optical fibers.

BACKGROUND ART

In recent years, transmission on digital signals has been used for a large capacity high-speed transmission without deterioration of image signals of such as photos and movies between devices like computers and liquid crystal displays.

The transmission between such devices has used a composite cable that is comprised of insulated conductors (metallic wires) for power feed and control signal transmission and optical fibers for large capacity high-speed transmission of digital signals, wherein these plural metallic wires and optical fibers are covered in a bundle with an overall sheath (refer to JP2006-310197A, for example).

FIG. 20 illustrates an example of a composite cable with its end fixed on a connector.

A composite cable 100, an example of such a composite cable as is described above, is connected to a device through a connector 101 as illustrated in FIG. 20 for example, wherein the end of the composite cable 100 is fixed inside the connector. The extremity of the composite cable 100 has its overall sheath 102 removed. Optical fibers 106 and metallic wires 107 of insulated conductors in the sheath-removed portion of the composite cable 100 are secured on the connector 101 respectively with an optical fiber fastener 105 and a metallic wire fastener 104 provided in the connector 101. The overall sheath 102 is secured on the connector 101 with an overall sheath fastener 103 provided in the connector 101.

SUMMARY OF THE INVENTION

The linear expansion coefficient of the metallic wires, optical fibers, and the overall sheath, which are the constituent members of the composite cable, are different each from the other. That is, the linear expansion coefficient of the overall sheath is larger than that of the metallic wires and the optical fibers. Consequently, the overall sheath will expand or shrink to a greater extent than the metallic wires and the optical fibers when the temperature of use environment varies.

This may possibly invite a risk of the optical fiber having a bending distortion or the end of the composite cable being unfastened from the fastener in the connector attributable to expansion or shrinkage of the overall sheath. Particularly, if bending distortion appears in the optical fiber, it may develop into breakage of the optical fiber or into increase in the transmission loss attributable to such bending distortion.

Further, when the composite cable is to be connected to an on-device connector or to be installed in such a place as requires bending a cable, bending applied to the composite cable will cause transmission loss in the optical fiber thereof. Consequently, the high-speed transmission of large capacity signals like digital signals may be not available. Particularly, in the case where a local lateral pressure affects the optical fibers in the composite cable, the increase in the transmission loss due to the bending becomes considerable with the high-speed transmission of large capacity signals like digital signals being not available.

In view of this problem, the object of the present invention is to provide a composite cable that is able to prevent both the unfastening of the cable end from the connector and the occurrence of the bending distortion of the optical fiber, to both of which the expansion and shrinkage of the overall sheath is responsible.

Further, the object of the present invention is to provide a composite cable that is suitable for the high-speed transmission of large capacity signals like digital signals preventing increase in the transmission loss caused by the bend of the optical fiber, even if the cable is to be installed in such a place as requires bending a cable.

MEANS FOR SOLVING THE PROBLEMS

To attain the object, the present invention provides a composite cable comprising a stranded wire that is a strand of a plurality of insulated conductors each of which is a conductor with insulation covering thereon, an optical fiber ribbon that has a plurality of optical fibers parallelly-arranged in a row, and an overall sheath that covers the stranded wire and the optical fiber ribbon in a bundle, wherein the composite cable has a deterrent positioned on outer side of the stranded wire and the optical fiber ribbon parallelly-arranged in a row along the width direction of the overall sheath for deterring expansion and shrinkage of the overall sheath and has a bonding jacket between the deterrent and the overall sheath for making the deterrent adhere to the overall sheath.

The deterrent may have a patterned indented shape on the surface thereof.

The patterned indented shape may be such a shape as is defined by an alternate array of a thick-portion and a thin-portion formed on the deterrent along the longitudinal direction thereof.

The patterned indented shape may be such a shape as is defined by a spiral groove formed on the deterrent over the longitudinal direction thereof.

A cushioning material may be arranged around the optical fiber ribbon.

The overall sheath may have a concave portion formed with concave-groove on at least one of the two lateral faces of the overall sheath facing each other, each of which faces is perpendicular to the thickness direction of the overall sheath.

The concave portion may be formed on a position where the bottom of the concave portion faces the optical fiber ribbon.

The stranded wire may be disposed on both sides of the optical fiber ribbon, being centered thereat, in the number at least one on the one side thereof.

An optical fiber ribbon group composed of a plurality of optical fiber ribbons arranged in the width direction or in the thickness direction, or both directions, of the overall sheath and a stranded wire group comprised of a plurality of stranded wires parallelly-arranged in a row in the width direction of the overall sheath may be disposed parallelly in the width direction of the overall sheath.

The optical fiber ribbon group may be made thinner in thickness than the diameter of the stranded wire.

The overall sheath may have an airspace between at least one of the two lateral faces of the overall sheath facing each other, each of which faces is perpendicular to the thickness direction of the overall sheath, and the optical fiber ribbon.

The airspace may be formed around the optical fiber ribbon so that the airspace will envelope the optical fiber ribbon.

By the present invention, it becomes practicable to obtain such a composite cable as is able to prevent both the unfastening of the cable end from the connector and the occurrence of the bending distortion of the optical fiber, to both of which the expansion and shrinkage of the overall sheath is responsible.

Further by the present invention, it becomes practicable to provide a composite cable that is suitable for the high-speed transmission of large capacity signals like digital signals preventing increase in the transmission loss caused by the bend of the optical fiber, even if the cable is to be installed in such a place as requires bending a cable.

DETAILED DESCRIPTION OF THE PREFERRED EMBODIMENTS

The following explains modes of implementing the present invention referring to drawings.

Embodiment 1

Figure 1:
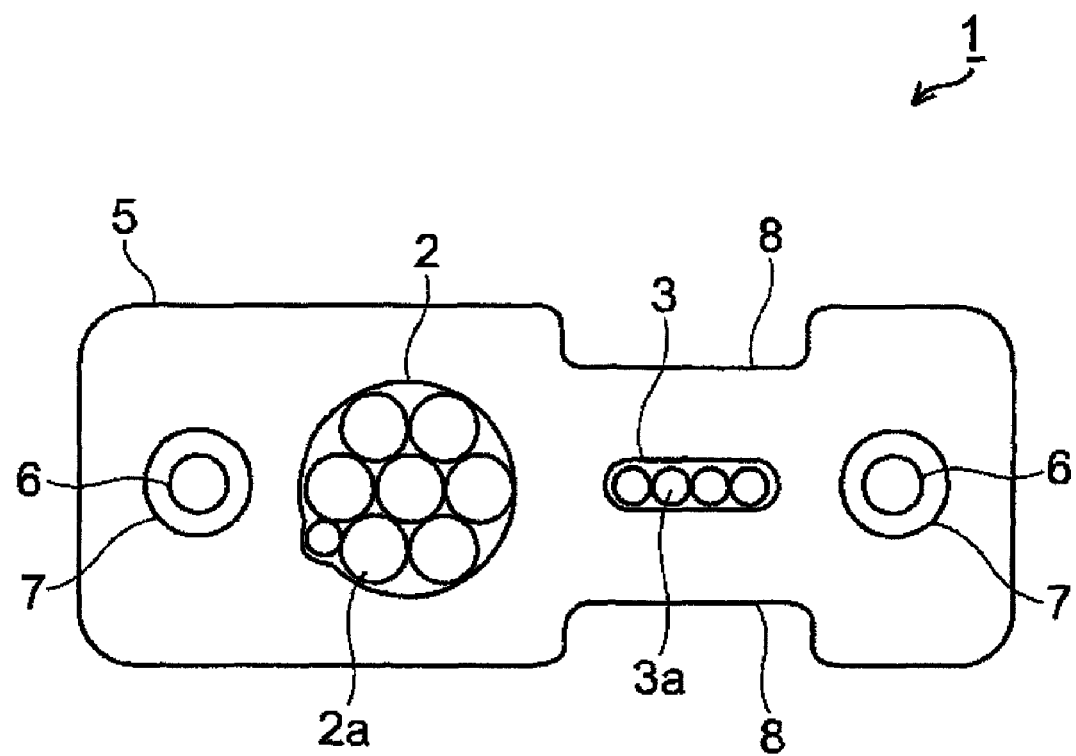
FIG. 1 is a sectional view of the composite cable of Embodiment 1 of the present invention.

FIG. 1 illustrates Embodiment 1 of the present invention. As FIG. 1 illustrates, a composite cable 1 by the present invention is comprised of a stranded wire 2 that is a strand of a plurality of (seven in FIG. 1) insulated conductors (metallic wires) 2a each of which is a conductor with insulation covering thereon, an optical fiber ribbon 3 that has a plurality of (four in FIG. 1) optical fibers 3a, each of which is made of quartz or similar material, arranged in a parallel-array (in a row), a deterrent 6, and an overall sheath 5 that covers the stranded wire 2, the optical fiber ribbon 3, and the deterrent 6 in a bundle.

The stranded wire 2 and the optical fiber ribbon 3 are arranged in a parallel-array (in a row) in the direction along which the optical fibers 3a are parallelly arranged in a row (side-to-side direction across the cross section illustrated in FIG. 1). The stranded wire 2 is used for, for example, power feeding or control signal transmission, and the optical fiber ribbon 3 is used for, for example, high-speed transmission of large capacity signals like digital signals. Where necessary, the stranded wire 2 may include a grounding wire (earth wire).

In this embodiment as can be known from FIG. 1, the deterrent 6 that deters expansion and shrinkage of the overall sheath 5 is provided on the outer side of the arrangement of the stranded wire 2 and the optical fiber ribbon 3 arrayed parallel along the width direction of the overall sheath 5; and a bonding jacket 7 that bonds the deterrent 6 to the overall sheath 5 is provided between the deterrent 6 and the overall sheath 5.

Throughout the present description, the "width direction" means a direction along the longer cross-sectional dimension of the composite cable sectioned at a given longitudinal point, and the "thickness direction" means a direction along the shorter cross-sectional dimension of the composite cable sectioned at a given longitudinal point. For example, "the width direction of an overall sheath" means the direction along the longer cross-sectional measurements across the overall sheath of the composite cable.

(Deterrent)

The composite cable 1 has the deterrent 6 comprised of a metallic wire to deter the expansion and shrinkage of the overall sheath 5. The deterrent 6 is embedded in the overall sheath 5 in the position on the axial line that connects the stranded wire 2 and the optical fiber ribbon 3, that is, on the axial line in the direction along which the stranded wire 2 and the optical fiber ribbon 3 are disposed parallel (side-to-side direction across the cross section illustrated in FIG. 1), and, at the same time, outer side of the stranded wire 2 or optical fiber ribbon 3, or both.

The deterrent 6 is arranged in a manner as illustrated in FIG. 1 for example such that one on the left of the stranded wire 2 in the direction across the cross section, and another one on the right of the optical fiber ribbon 3 in the direction across the cross section; the total number of the deterrent 6 is two. It is preferable that the deterrent 6 should be provided at least one on the outer side of the stranded wire 2 or the optical fiber ribbon 3, or both.

The deterrent 6 is comprised of a metallic wire, over which the bonding jacket 7 is applied. The deterrent 6 and the bonding jacket 7 are bonded mutually by a bonding means that provide such a bonding strength as is stronger than a force that will appear in the overall sheath 5 due to its expansion and shrinkage with temperature variation. The bonding jacket 7 is comprised of the same material as used in the overall sheath 5. When extruding the overall sheath 5 using a known method, the bonding jacket 7 melts due to the heat of the overall sheath 5 to fuse with the overall sheath 5. Thereby, the deterrent 6 strongly bonds to the overall sheath 5 via the bonding jacket 7.

The bonding jacket 7 may be embodied in another style of constitutional member such that the member partially covers the deterrent 6 subject to such member being provided between the deterrent 6 and the overall sheath 5; the embodying style is not limited only to covering the entire periphery of the deterrent 6.

The linear expansion coefficient of the deterrent 6 comprised of metallic wire is, for example, as small as 10 to $30 \times 10^{-6}/°$ C. compared to that of the overall sheath 5 of such as polyethylene, which is 100 to $200 \times 10^{-6}/°$ C. Therefore, even if the overall sheath 5 is to shrink with the temperature variation of the usage environment particularly variation to low temperatures, the overall sheath 5 would not shrink beyond the shrinkage extent of the deterrent 6, because the deterrent 6 is strongly bonded to the overall sheath 5 with the bonding jacket 7. This behavior prevents the optical fiber 3a from suffering from bending attributable to shrinkage of the overall sheath 5.

The linear expansion coefficient of the optical fiber 3a comprised of quartz is, for example, 0.4 to $0.55 \times 10^{-6}/°$ C. Therefore, the difference of the linear expansion coefficient between the deterrent 6 of metallic wire, which is 10 to $30 \times 10^{-6}/°$ C., and the optical fiber 3a is smaller than the difference of the linear expansion coefficient between the overall sheath 5, which is 100 to $200 \times 10^{-6}/°$ C., and the optical fiber 3a. Accordingly, the expansion and shrinkage of the overall sheath 5 attributable to the temperature variation of usage environment of the overall sheath 5 will be deterred within the extent of those of the deterrent 6 of metallic wire. As a consequence of this, such problems that the bending distortion may occur in the optical fiber 3a due to the expansion or shrinkage of the overall sheath 5 and that the optical fiber 3a may be unfastened from the fastener provided in the on-device connector because of the protrusion of the optical fiber 3a from the end of the overall sheath 5, are prevented. Particularly, the preventing of occurrence of the bending distortion in the optical fiber 3a enables the evading of such problems as are break of the optical fiber 3a due to a mechanical distortion attributable to the bending distortion and signal deterioration due to increase in transmission loss attributable to the micro-bend.

In the composite cable 1 of the embodiment of the present invention as stated above, the deterrent 6 is provided on the outer side of the arrangement of the stranded wire 2 and the optical fiber ribbon 3 arrayed parallel along the width direction of the overall sheath 5 and the bonding jacket 7 is provided between the deterrent 6 and the overall sheath 5. Thereby, it becomes practicable to deter both the unfastening of the end from the connector caused by expansion or shrinkage of the overall sheath 5 and the occurrence of the bending distortion in the optical fiber attributable to temperature variation without enhancing the adhesion strengths of the stranded wire 2 and the optical fiber 3 with the overall sheath 5. When the adhesion strengths of the stranded wire 2 and the optical fiber 3 to the overall sheath 5 is enhanced, the end treatment of the optical fiber 3a and the metallic wire 2a for terminating on the connector, or similar devices, will possibly encounter a difficulty in separating the optical fiber 3a and the metallic wire 2a from the overall sheath 5. In this embodiment however, the optical fiber 3a and the metallic wire 2a can be separated easily because it is not necessary to enhance the adhesion strength of the stranded wire 2 and the optical fiber 3 to the overall sheath 5. This means that the present invention has another effect such that the cable end treatment is improved in its workability in terminating the optical fiber 3a and the metallic wire 2a on the connector suppressing increase in the transmission loss due to the expansion or shrinkage of the overall sheath 5 attributable to the temperature variation.

(Concave Portion)

As FIG. 1 illustrates, the overall sheath 5 has concave portions 8-8 each formed with concave-groove on at least one of the two lateral faces of the overall sheath 5 facing each other, each of which faces is perpendicular to the thickness direction of the overall sheath 5.

The concave portions 8-8 should be formed preferably on a position where the bottom of the concave portion faces the optical fiber ribbon 3.

Forming the concave portions 8-8 on the surface of the overall sheath 5 in the manner as stated above provides such an effect that having a look at the external view of the composite cable 1 permits to locate the optical fiber ribbon 3. Further, this configuration provides such an effect as prevents a lateral pressure from causing a bending in the optical fiber ribbon 3 and suppresses increase in the transmission loss due to the lateral pressure when the lateral pressure is affecting the composite cable 1 in the direction perpendicular to the axial line that connects the stranded wire 2 and the optical fiber ribbon 3, that is, when the lateral pressure is being imposed on at least one of the two lateral faces of the overall sheath 5 facing each other, each of which faces is perpendicular to the thickness direction of the overall sheath 5.

In implementing the present invention, there is no particular limitation of the spread in forming the concave portion 8-8. In the view of above stated effect however, it is preferable to give the width of the concave portion a dimension of equal to or larger than the width of the optical fiber ribbon 3.

Figure 2:
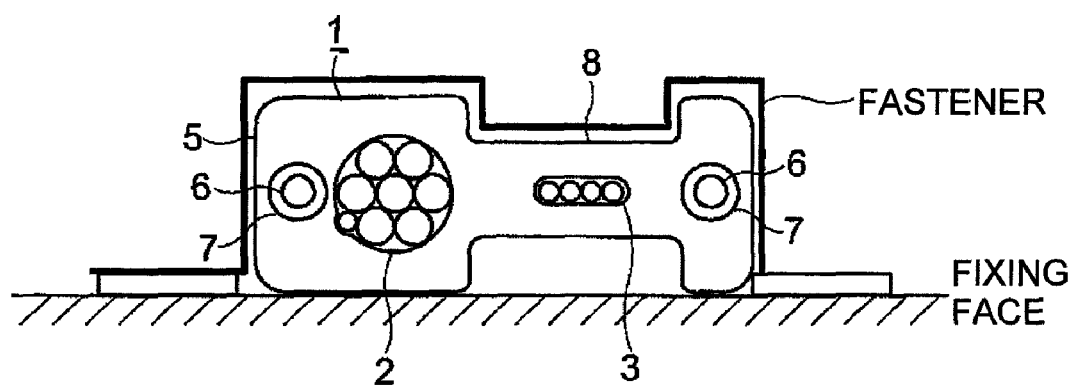
FIGS. 2(a) and 2(b) are as-installed drawings that exhibit the state of the composite cable illustrated in FIG. 1 installed on a cable fixing face.
Figure 2:
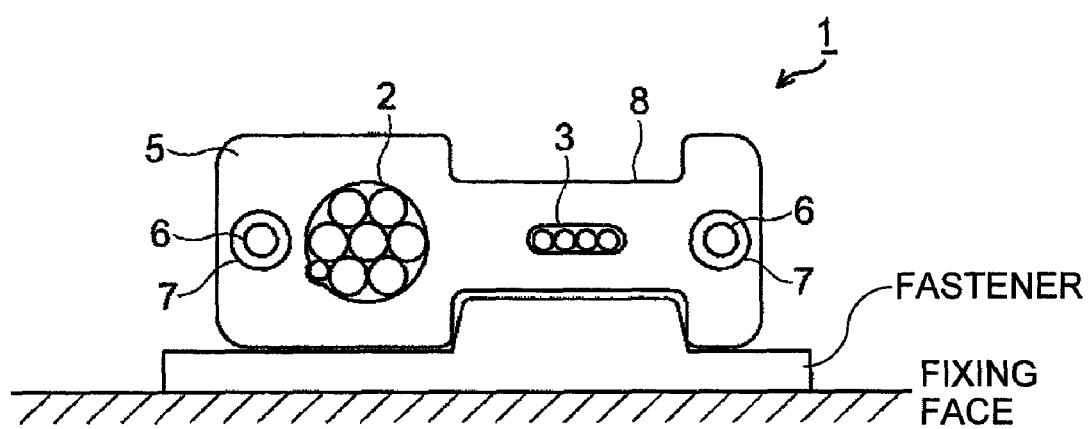

FIG. 2 is the as-installed drawing that exhibits the state of the composite cable 1 illustrated in FIG. 1 installed on a cable fixing face. In fixing the composite cable 1 of the embodiment of the present invention on a floor or a wall, use of a fastener (fixing device) having a shape adaptive to the shape of the concave portion 8 formed on the surface of the overall sheath 5 of the composite cable 1, as illustrated in FIG. 2(a), eases positioning the composite cable 1 with handleability improved.

When a limited working space or other site-dependent conditions in a installation place does not permit use of a fastener having such an shape as surrounds the composite cable 1, such a fastener (fixing device) as has a convex protrusion portion formed in a shape adaptive to the shape of the concave portion 8 formed on the surface of the overall sheath 5 can be used between the composite cable 1 of the present invention and the fixing face, which is a floor or a wall, for securing the cable as illustrated in FIG. 2(b). As an example of such fastener having the convex protrusion portion, a double-faced tape having a convex protrusion portion can be feasible for use. As stated above, even if the working space in the installation place is limited, placing the fastener having convex protrusion portion in the place where the composite cable 1 is to be installed and engaging the concave portion 8 with the convex protrusion portion permits installing the composite cable 1 in place. This eases positioning the composite cable 1 with handleability improved more.

Figure 3:
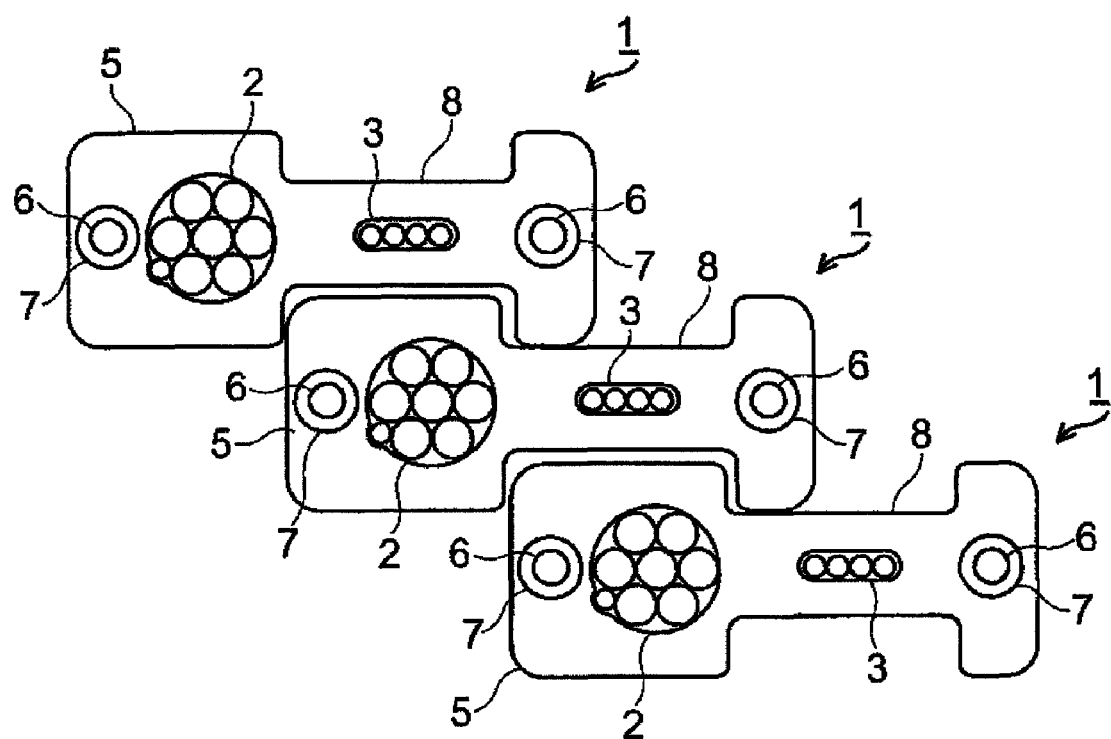
FIG. 3 is an illustration that exhibits the state in which a plurality of composite cables is in being stacked.

FIG. 3 illustrates the state in which a plurality of composite cables exhibited in FIG. 1 is in being stacked. As FIG. 3 illustrates, a plurality of the composite cables 1 of the Embodiment 1 of the present invention are arranged in a stack. In this arrangement, the width of the concave portion 8 on the lateral face of the overall sheath 5 where the concave portion 8 is formed is given a width equal to or larger than the width of such a portion of the overall sheath 5 where no concave portion is formed. By this dimensional configuration, wherein the width of the concave portion 8 is made equal to or larger than the width of the no concave portion, it becomes practicable to make plural composite cables 1 engage into one unit without special items such as binding strap.

In the present invention, the concave portion 8 provides such an effect that the external view of the composite cable 1 permits locating the optical fiber ribbon 3, that increase in the transmission loss due to the lateral pressure affecting on the composite cable 1 is suppressed, and further that the shape of the concave portion 8 eases positioning the composite cable 1 in installation with handleability improved.

Above descriptions on the deterrent 6, the concave portion 8, and related matters were made based on Embodiment 1 of the present invention. However, applicability of those explanatory descriptions is not limited to Embodiment 1, but also applicable to all the embodiments that will appear later.

Embodiment 2

Figure 4:
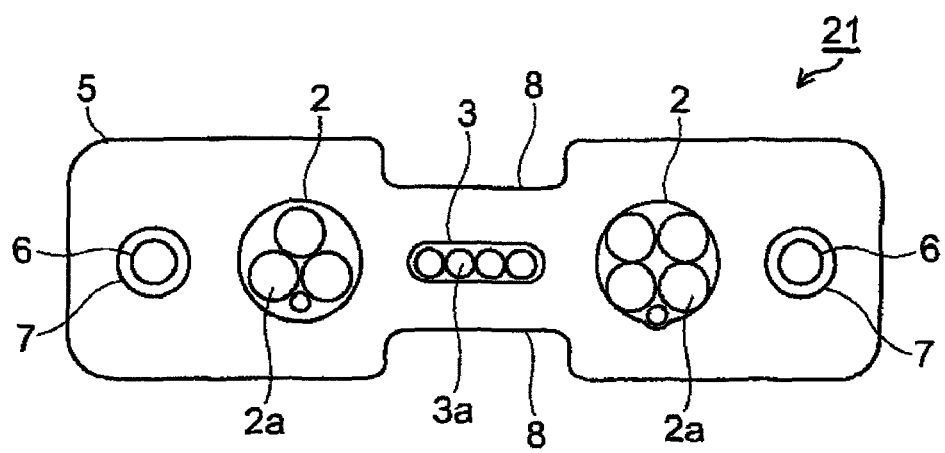
FIGS. 4(a) and 4(b) are sectional views of the composite cables of Embodiment 2 of the present invention.
Figure 4:
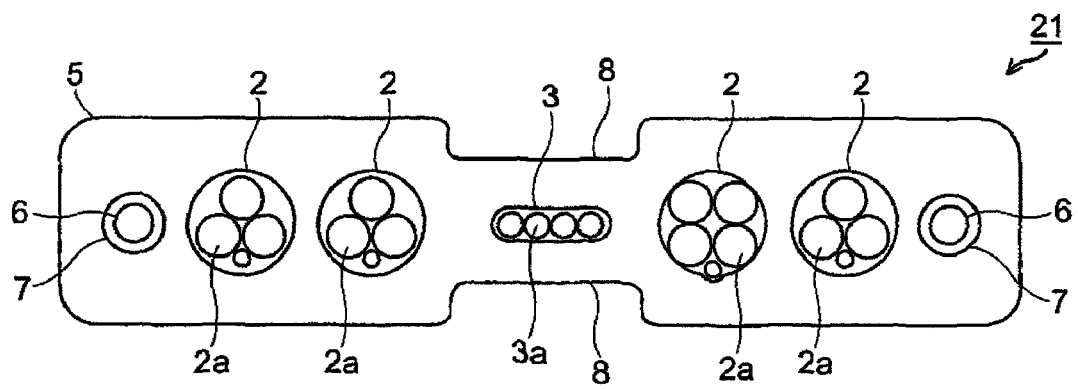

FIG. 4 illustrates Embodiment 2 of the present invention. A composite cable 21 illustrated in FIG. 4(a) has a different construction from that of Embodiment 1 illustrated in FIG. 1 with respect to the construction of a stranded wire 2 and an optical fiber ribbon 3. Those explanations in Embodiment 1 of the present invention illustrated in FIG. 1 that will be commonly applicable to Embodiment 2 are omitted; and only those aspects different from Embodiment 1 are explained hereunder referring to FIG. 4.

The composite cable 21 illustrated in FIG. 4(a) has such a construction that each of the both sides in the width direction of the optical fiber ribbon 3, which has four optical fibers 3a arranged in a parallel-array, has one stranded wire 2 being centered at the optical fiber ribbon 3, that is, two stranded wires 2 in total.

An overall sheath 5 in this embodiment is preferred to be provided with concave portions 8-8 each having a width larger than the width of the optical fiber ribbon 3 in the position facing the optical fiber ribbon 3.

As mentioned above in the embodiment of the present invention, one or more stranded wires 2 may be disposed respectively on both sides of the optical fiber ribbon 3 being centered thereat.

In this embodiment, it is enough to dispose at least one stranded wire 2 on each of both sides of the optical fiber ribbon 3, being centered thereat. Therefore, it may be a feasible arrangement that more than one stranded wire 2 is disposed on each of both sides of the optical fiber ribbon 3. Instead, an arrangement in which the number of the stranded wire 2 is plural on one side and single (one) on the other side may also be feasible.

As stated above, disposing at least one stranded wire 2 on each of both sides of the optical fiber ribbon 3, being centered thereat, gains more effectively the function and effects by the concave portion 8 formed on the overall sheath 5.

Embodiment 3

Figure 5:
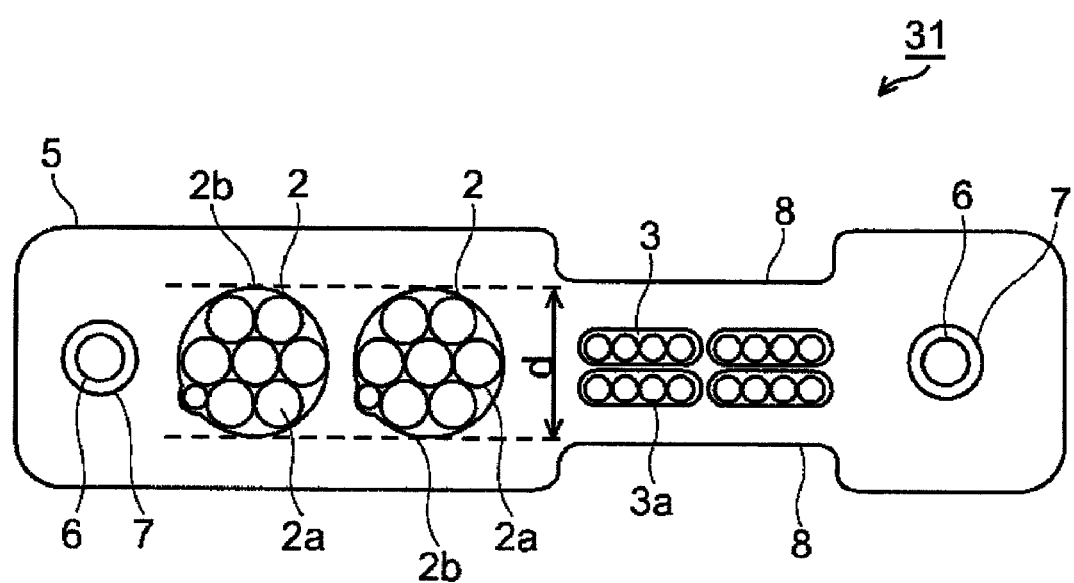
FIG. 5 is a sectional view of the composite cable of Embodiment 3 of the present invention.

FIG. 5 illustrates Embodiment 3 of the present invention. A composite cable 31 illustrated in FIG. 5 is such a composite cable that the stranded wire 2 and the optical fiber ribbon 3 in the composite cable 1 illustrated in FIG. 1 are arranged respectively in the plural number. With respect to arrangement of a stranded wire 2 and an optical fiber ribbon 3 in this embodiment, an example would be such that as illustrated in FIG. 5. In the arrangement example illustrated, an optical fiber ribbon group comprised of: a pile of two optical fiber ribbons 3 disposed in parallel arrangement in the width direction of an overall sheath 5 and another two optical fiber ribbons 3 disposed in the same manner stacked in the thickness direction of the overall sheath 5, and a stranded wire group comprised of two stranded wires 2 disposed in parallel arrangement in the width direction of the overall sheath 5, are arrayed in a parallel arrangement in the width direction of the overall sheath 5. Practicable arrangements however are not limited to this explanatory example. Variations or modifications in the implementing details of the number of the stranded wire 2 or the optical fiber ribbon 3 and positional arrangement thereof may be feasible depending on the place of installation or usage, etc.

Also in this embodiment, the overall sheath 5 is preferred to be provided with concave portions 8-8 each having a width larger than the width of the optical fiber ribbon 3 in the position facing the optical fiber ribbon 3.

In this case, the thickness of the optical fiber ribbon group is preferred not to be larger than the diameter d of the stranded wire 2. This comes from such a reason that, if the thickness of the optical fiber ribbon group is designed in excess of the diameter d of the stranded wire 2, the lateral pressure affects on the optical fiber ribbon 3 before its pressuring effect reaches the stranded wire 2 when a lateral pressure is impressed on the composite cable 31, resulting in an increased transmission loss in an optical fiber 3a due to the lateral pressure.

When the arrangement employs optical fiber ribbons 3 and stranded wire 2 respectively in the plural number however, the depth of the concave portion 8 formed on the overall sheath 5 should preferably be formed to a level of depth that reaches at least the periphery 2b of the stranded wire 2 in the thickness direction of the overall sheath 5 so that the thickness of the optical fiber ribbon group will not be larger than the diameter d of the stranded wire 2.

Embodiment 4

Figure 6:
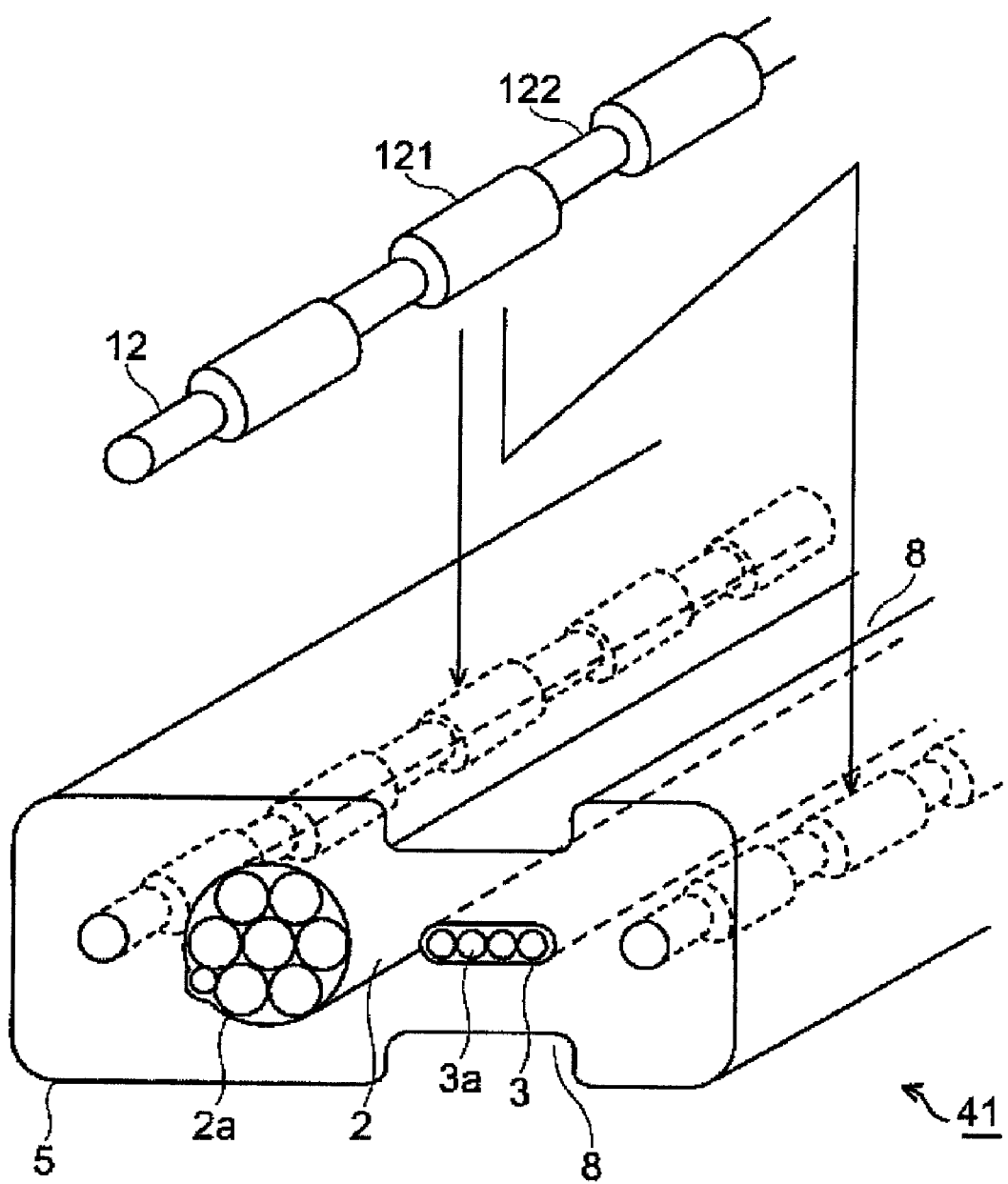
FIG. 6 is a perspective sectional view of the composite cable of Embodiment 4 of the present invention.

FIG. 6 illustrates Embodiment 4 of the present invention. A composite cable 41 illustrated in FIG. 6 is comprised of one optical fiber ribbon 3, one stranded wire 2, and concave portions 8-8 formed on an overall sheath 5 at the position that faces the optical fiber ribbon 3; this configuration is the same as that in Embodiment 1. In this embodiment however, the construction of the deterrent is different.

A deterrent 12 in this embodiment has a patterned indented shape given by a surface roughening processing. The deterrent 12 is comprised of a metallic wire, on which a patterned indented shape having an alternate array of a thick-portion 121 and a thin-portion 122 are formed. This patterned indented shape allows the overall sheath 5 to invade in a stepped-portion formed by the shape transition between the thick-portion 121 and the thin-portion 122. Thereby, the deterrent 12 coheres strongly to the overall sheath 5. Further, such a portion of the overall sheath 5 as is invading the stepped-portion works as a resistance to contribute to the deterring the longitudinal expansion and shrinkage of the overall sheath 5 along the composite cable 41. Thereby, the expansion and the shrinkage of the overall sheath 5 due to temperature variation are suppressed by the deterrent 12 that has the thick-portion 121 and the thin-portion 122.

Above explanation was made based on that the deterrent 12 being given the patterned indented shape thereon by the surface roughening processing applied thereon. However, embodiment is not limited to this manner. The deterrent 12 having the patterned indented shape may be formed by chaining alternately separate elements of the thick-portion 121 and the thin-portion 122.

As described above in this embodiment, it is not necessary to provide a bonding jacket on the deterrent 12, because the stepped-portion formed by the thick-portion 121 and the thin-portion 122 suppresses the shrinkage of the overall sheath 5 due to temperature variation. Therefore, the process for applying the bonding jacket over the deterrent 12 can be omitted with processing steps simplified and cost lowered.

Embodiment 5

Figure 7:
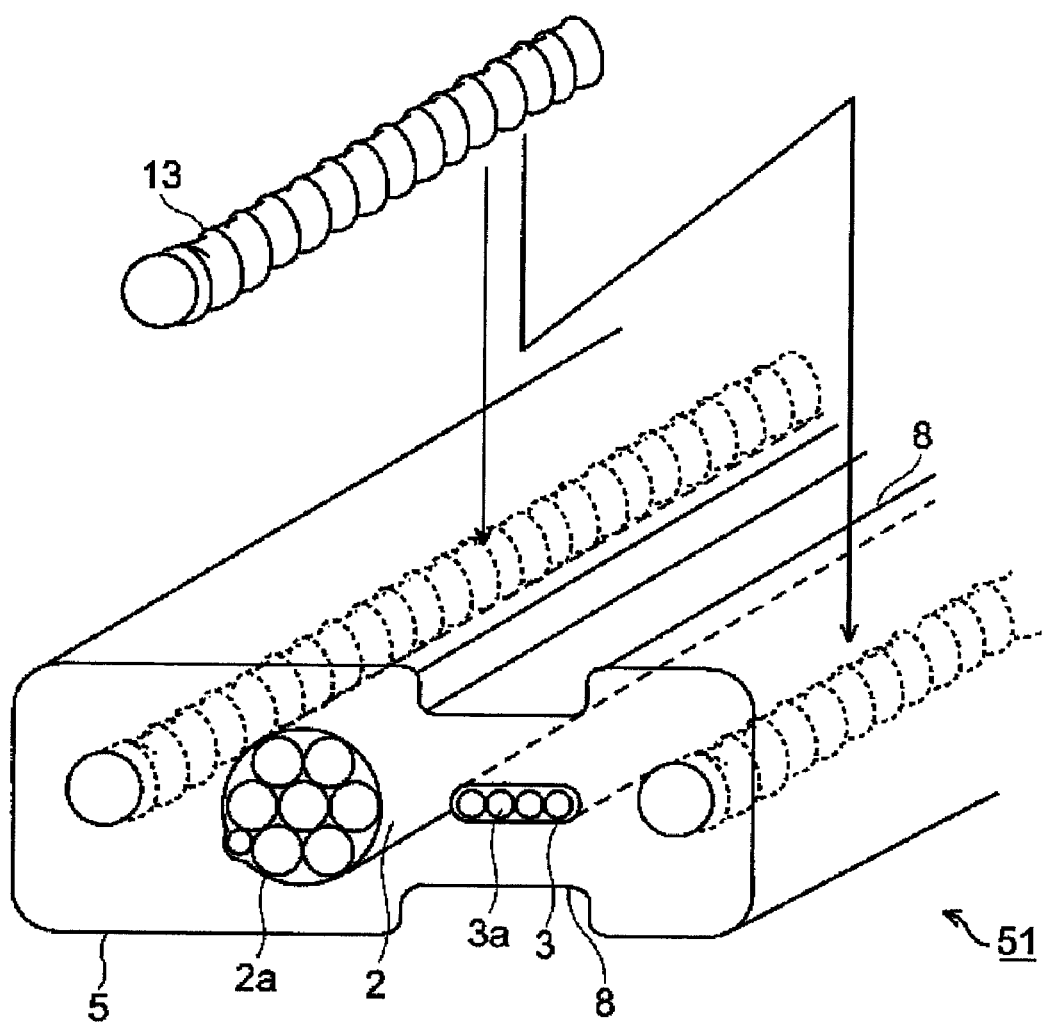
FIG. 7 is a perspective sectional view of the composite cable of Embodiment 5 of the present invention.

FIG. 7 illustrates Embodiment 5 of the present invention. A composite cable 51 illustrated in FIG. 7 uses a metallic wire given a surface roughening processing; this configuration is same as that in Embodiment 4. In Embodiment 5 however, the mode of the surface roughening processing, that is, the shape of unevenness of the surface of the deterrent, is different from the one in Embodiment 4.

In this embodiment, a deterrent 13 of metallic wire is used, wherein the deterrent 13 has a spiral groove formed thereon by the surface roughening processing. Use of this style of the deterrent 13 having spiral groove allows an overall sheath 5 to invade in the groove; thereby the deterrent 13 coheres strongly to the overall sheath 5. Further, such a portion of the overall sheath 5 as is invading the spiral groove formed on the deterrent 13 works as a resistance to contribute to the deterring the longitudinal expansion and shrinkage of the overall sheath 5 along the composite cable 51. Thereby, the expansion and the shrinkage of the overall sheath 5 due to temperature variation are suppressed by the deterrent 13 that has the spiral groove.

As described above in this embodiment, it is not necessary to provide a bonding jacket on the deterrent 13, because the spiral groove formed on the deterrent 13 suppresses the shrinkage of the overall sheath 5 due to temperature variation. Therefore, such an effect that the process for applying the bonding jacket over the deterrent 13 can be omitted with processing steps simplified and cost lowered likewise Embodiment 4 is obtained.

Embodiment 6

Figure 8:
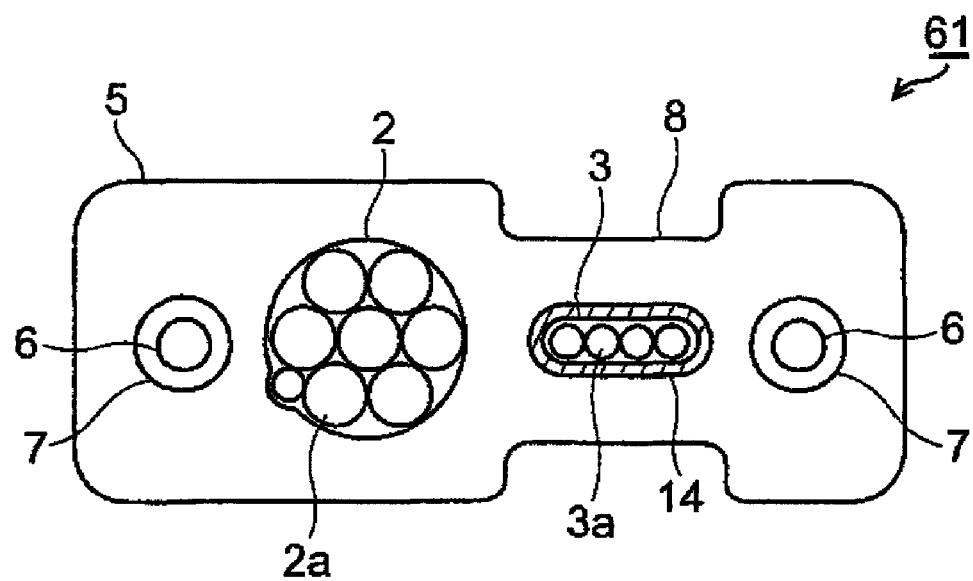
FIG. 8 is a sectional view of the composite cable of Embodiment 6 of the present invention.

FIG. 8 illustrates Embodiment 6 of the present invention. A composite cable 61 illustrated in FIG. 8 is comprised of one optical fiber ribbon 3, one stranded wire 2, and a concave portion 8 formed on an overall sheath 5 at the position that corresponds to the location of the optical fiber ribbon 3; this configuration is the same as that in Embodiment 1. In this embodiment however, the construction is different in that a cushioning material is provided around the optical fiber ribbon 3.

As FIG. 8 illustrates, a cushioning material 14 is disposed around the optical fiber ribbon 3 that has four optical fibers 3a arranged in a parallel-array. As for the cushioning material 14, a material like Kevlar™ is used. Other material that provides equivalent effects may be optionally selected for use as the cushioning material 14 without being limited to Kevlar.

Because of the cushioning material 14 being arranged around the optical fiber ribbon 3 and thereby the optical fiber ribbon 3 being not bound, the influence that will appear in the optical fiber ribbon 3 due to the expansion and shrinkage of the overall sheath 5 attributable to the temperature variation can be more effectively reduced. This means that an effect on the optical fiber ribbon 3, which causes an increase of the transmission loss, attributable to expansion and shrinkage of the overall sheath 5 due to variation of use environment temperature can be suppressed more effectively.

Since the optical fiber ribbon 3 is not bound because of the cushioning material 14, the optical fiber 3a can be separated easily from the overall sheath 5 in the end treatment of the composite cable 61 for terminating on a connector with the workability improved more.

The cable construction stated above was such a configuration that the cushioning material 14 was arranged around the optical fiber ribbon 3 in the composite cable in Embodiment 1 illustrated in FIG. 1. However, it is also feasible to arrange the cushioning material 14 around the optical fiber ribbon 3 in, for example, the composite cables defined respectively in Embodiment 2 as illustrated in FIG. 4, in Embodiment 3 as illustrated in FIG. 5, in Embodiment 4 as illustrated in FIG. 6, and in Embodiment 5 as illustrated in FIG. 7.

Embodiment 7

Figure 9:
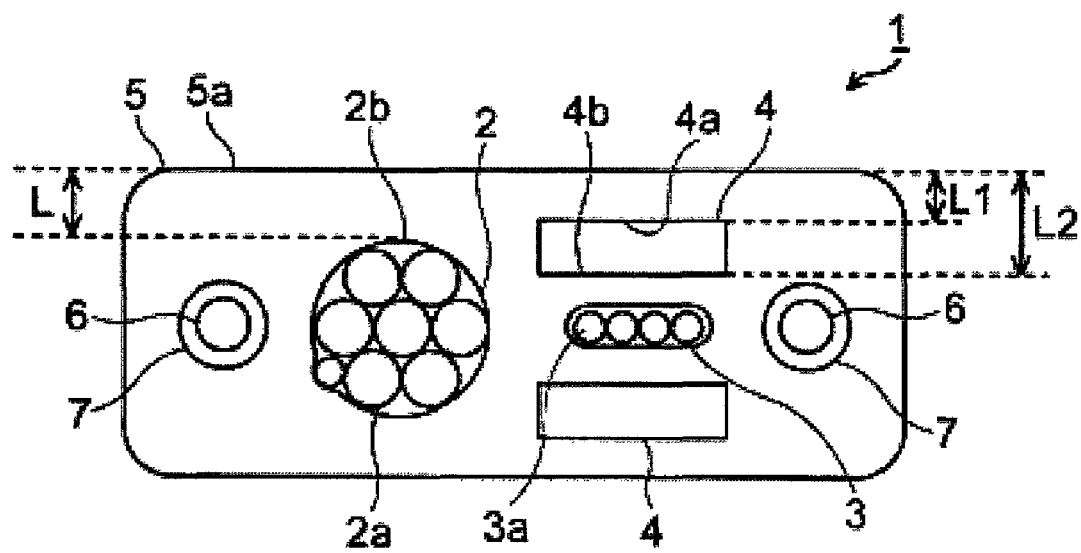
FIG. 9 is a sectional view of the composite cable of Embodiment 7 of the present invention.

FIG. 9 is a sectional view of a composite cable in Embodiment 7.

In this embodiment as FIG. 9 illustrates, an airspace 4 is formed in an overall sheath 5 of a composite cable 1 around an optical fiber ribbon 3. For example as illustrated in FIG. 9, the overall sheath 5 has at least one airspace 4 (two in FIG. 9) in the area between one of the two lateral faces of the overall sheath 5 facing each other, each of which faces is perpendicular to the thickness direction (vertical direction across the cross section illustrated in FIG. 9) of the overall sheath 5 and the optical fiber ribbon 3.

(Airspace)

In Embodiment 7, the airspace 4 is rectangle in its cross section (approximately oblong in FIG. 9); it is in this case preferable to have a width (side-to-side direction across the cross section illustrated in FIG. 9) larger than the width of the optical fiber ribbon 3 illustrated in FIG. 9. It is further preferable that the distance between at least one of two lateral faces 4a and 4b of the airspace 4 facing each other, each of which faces is perpendicular to the thickness direction of the airspace 4, and one of two lateral faces of the overall sheath 5 facing each other, each of which faces is perpendicular to the thickness direction of the overall sheath 5, is made shorter than the shortest distance between the surface of the stranded wire 2 and one of two lateral faces of the overall sheath 5 facing each other, each of which faces is perpendicular to the thickness direction of the overall sheath 5.

As FIG. 9 illustrates for example, the airspace 4 is formed so that the position of the lateral face 4a, which is one of two lateral faces of the airspace 4 facing each other, each of which faces is perpendicular to the thickness direction of the airspace 4, being on the side nearer to a lateral face 5a that is one of two lateral faces of the overall sheath 5 facing each other, each of which faces is perpendicular to the thickness direction of the overall sheath 5, will cause the distance L1 between the lateral face 4a and the a lateral face 5a of the overall sheath 5 to be shorter than the shortest distance L between a periphery 2b of the stranded wire 2, which is the surface thereof, and the lateral face 5a of the overall sheath 5 (that is, L1<L).

Alternatively, the side 4b may be positioned so that the distance L2 to the lateral face 5a of the overall sheath 5 will be longer than the distance L (that is, L2>L) as illustrated in FIG.

1, wherein the lateral face 4b is one of two lateral faces of the airspace 4 facing each other, each of which faces is perpendicular to the thickness direction of the airspace 4, being on the side far off the lateral face 5a of the overall sheath 5, or instead, may be located in such a position as will cause the distance L2 to be shorter than the distance L (that is, L2<L).

By providing the airspace 4 in this manner in the overall sheath 5, it can be prevented that the transmission loss of the optical fiber 3a, a constituent of the optical fiber ribbon 3, would increase due to bending resulted from a lateral pressure from outside even when the installation place requires bending or impresses a local lateral pressure.

In the composite cable 1 in this embodiment, a bonding jacket 7 is provided around a deterrent 6 illustrated in FIG. 9 in the same manner as Embodiment 1 to give adherence of the deterrent 6 to the overall sheath 5. The deterrent 6 illustrated in FIG. 9 may be made of a metallic wire having a patterned indented shape on its surface. The pattern of indentation on the metallic wire is an alternate array of a thick-portion and a thin-portion, which pattern is the same as Embodiment 4, or is a spiral groove given by a surface roughening processing, which pattern is the same as Embodiment 5.

Figure 10:
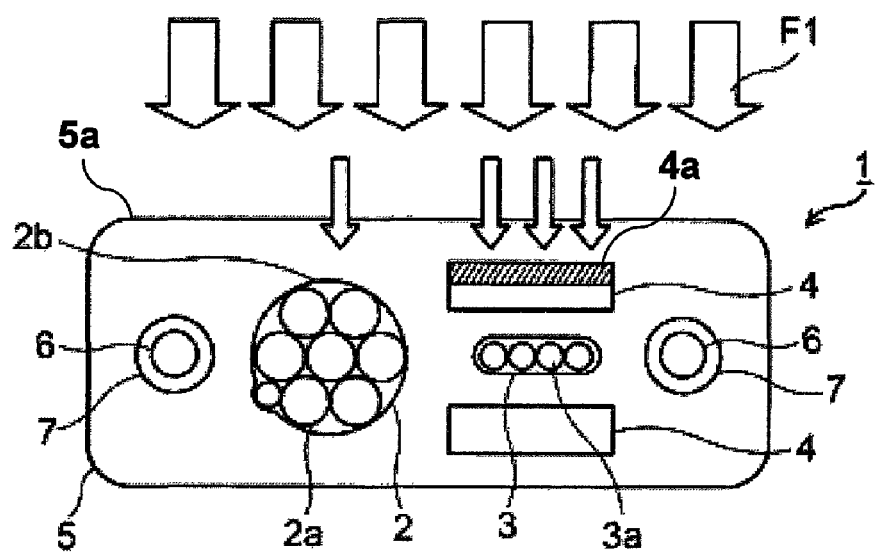
FIG. 10(a) exhibits such a state that a lateral pressure is impressed over one lateral face of the composite cable illustrated in FIG. 9 and FIG. 10(b) exhibits such a state that a lateral pressure is impressed locally on one lateral face of the composite cable illustrated in FIG. 9.
Figure 10:
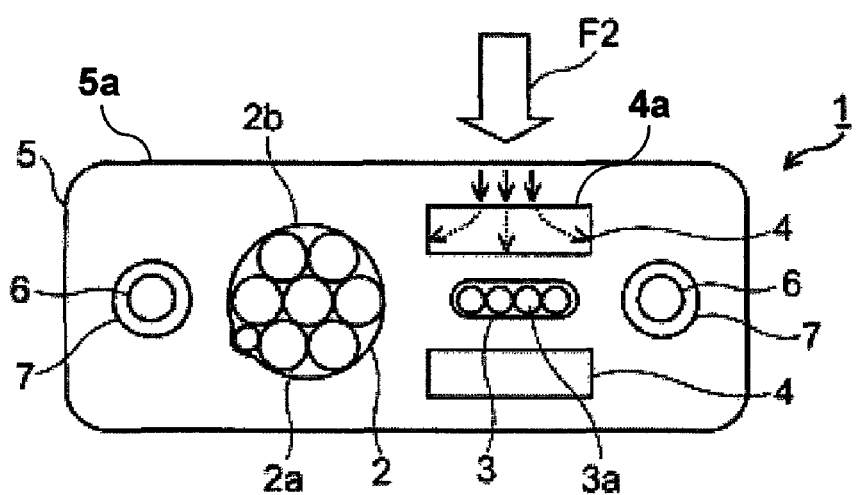

FIG. 10 exhibits such a state that a lateral pressure is impressed on the composite cable 1 illustrated in FIG. 9.

FIG. 10(a) exhibits such a state that a lateral pressure is impressed over one lateral face of the composite cable 1 illustrated in FIG. 9.

FIG. 10(b) exhibits such a state that a lateral pressure is impressed locally on one lateral face of the composite cable 1 illustrated in FIG. 9.

As FIG. 10(a) illustrates, when a lateral pressure acts over one lateral face of the composite cable 1 (a lateral face perpendicular to the thickness direction of the overall sheath 5) while installing in such a place as requires bending, the lateral pressure working on one lateral face on the overall sheath 5 affects inside the composite cable 1 through the overall sheath 5.

This means that, in a portion on or around the stranded wire 2, the lateral pressure is impressed around the periphery 2b, wherein the periphery 2b is such a surface area of the stranded wire 2 as faces the lateral face 5a onto which the lateral pressure on the overall sheath 5 acts, or is such a surface area of the stranded wire 2 as is in the position of which distance from the side face 5a onto which the lateral pressure on the overall sheath 5 acts is the shortest. Under this situation, the lateral pressure can cause compression or deformation of the overall sheath 5 in the area, onto which the lateral pressure acts, between the side face 5a of the overall sheath 5 and the periphery 2b of the stranded wire 2. On the other hand, however, a reacting force appears on the periphery 2b against the lateral pressure impressed. This enables the periphery 2b to suppress the consequences of the lateral pressure impressed such as compression and deformation and to prevent the area inside the periphery 2b (center area of the composite cable 1) from effect of the lateral pressure.

In a portion on or around the optical fiber ribbon 3, the lateral pressure acts on the lateral face 4a of the airspace 4 provided in the thickness direction (vertical direction across the cross section illustrated in FIG. 10(a)) of the optical fiber 3a of the optical fiber ribbon 3. In this situation, the airspace 4 elastically deforms in the shaded area illustrated in FIG. 10(a) absorbing the lateral pressure acting on the airspace 4, wherein the shaded area is a spread of the airspace 4 toward the surface of the overall sheath 5 beyond at least the periphery 2b of the stranded wire 2. Thereby, it is suppressed that the compression or deformation due to the lateral pressure affects inside the airspace 4 with the lateral pressure prevented from reaching the optical fiber ribbon 3.

Therefore, even if a lateral pressure acts over one lateral face of the overall sheath 5 while installing in such a place as requires bending, it can be prevented that the transmission loss increases due to the bend of the optical fiber 3a. Thereby, a composite cable that is suitable for the high-speed transmission of large capacity signals like digital signals can be provided.

In the case where a local lateral pressure is impressed on one lateral face of the composite cable 1 illustrated in FIG. 9 (a lateral face perpendicular to the thickness direction of the overall sheath 5) as illustrated in FIG. 10(b), a lateral pressure acts on the lateral face 4a of the airspace 4 provided in the thickness direction (vertical direction across the cross section illustrated in FIG. 10(b)) of the optical fiber ribbon 3. This means that, in FIG. 10(b), particularly in the case when a local lateral pressure is acting on the lateral face 5a of the overall sheath 5 in such a specific location as has the optical fiber ribbon 3 underneath, such local lateral pressure acting on such specific location effects the airspace 4 since the airspace 4 is formed in the area between the optical fiber ribbon 3 and the lateral face 5a of the overall sheath 5. The local lateral pressure effecting on the airspace 4 diffuses over and absorbed in the airspace 4 as illustrated in FIG. 10(b) by the elastic deformation of the airspace 4 rendered by elasticity of the overall sheath 5 in a similar manner as explained regarding FIG. 10(a). Thereby, the effect of the compression or deformation due to the locally acting lateral pressure is prevented from reaching the optical fiber ribbon 3.

Therefore, even if a lateral pressure acts over one lateral face of the composite cable 1 illustrated FIG. 9 (a lateral face perpendicular to the thickness direction of the overall sheath 5) as illustrated in FIG. 10(b), it can be prevented by the airspace 4 formed inside the overall sheath 5 that the transmission loss of the optical fiber 3a, a constituent of the optical fiber ribbon 3, increases due to the bending resulted from a local lateral pressure. Thereby, a composite cable that is suitable for the high-speed transmission of large capacity signals like digital signals can be provided.

Figure 11:
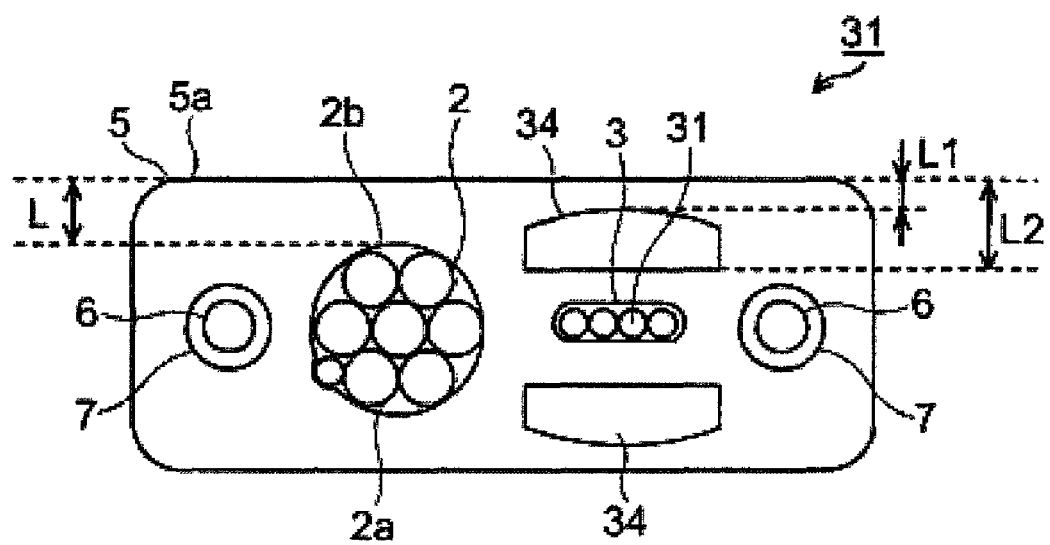
FIG. 11 is a sectional view of an example of modification of the composite cable of Embodiment 7 of the present invention.
Figure 12:
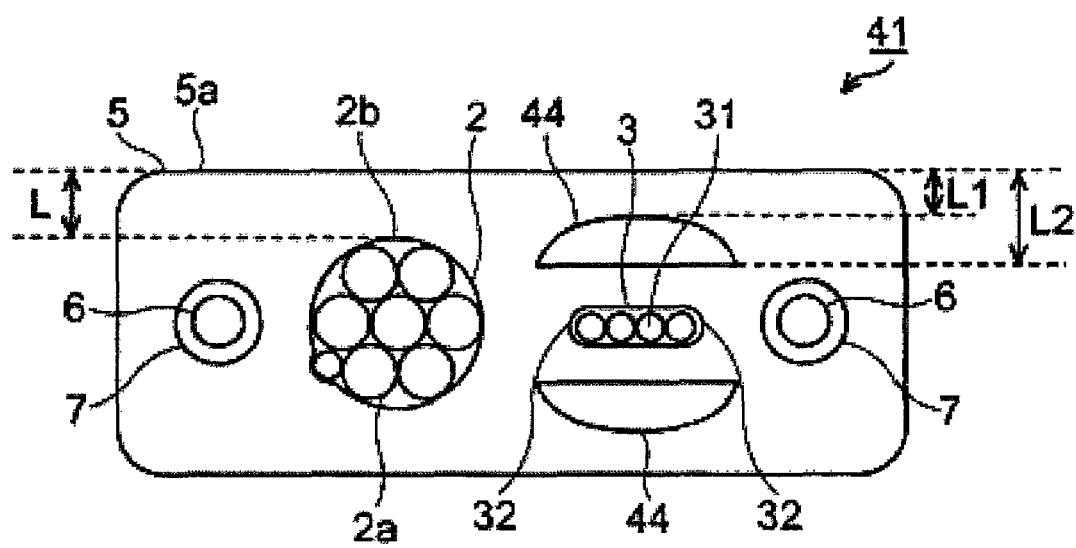
FIG. 12 is a sectional view of another example of modification of the composite cable of Embodiment 7 of the present invention.

FIGS. 11 and 12 are sectional views of examples of modifications of the composite cable of Embodiment 7.

The composite cable 1 in Embodiment 7 had such a construction that the airspace 4 formed in the overall sheath 5 had an approximately oblong-shape of rectangular section. However, as illustrated in FIG. 11 or FIG. 12, the lateral face of the airspace 4 (the lateral face perpendicular to the thickness direction thereof) facing the lateral face 5a of the overall sheath 5 (the lateral face perpendicular to vertical direction across the cross section illustrated in FIGS. 11 and 12) may be such airspaces 34 or 44 as has a curved shape in cross section such as a bent, a half-moon, or half-ellipsoid.

By making an airspace 34 have such a curved shape in its cross-sectional feature that the lateral face thereof, which faces the lateral face of the overall sheath 5 in the thickness direction, bulges out (curves out) toward the lateral face 5a of the overall sheath 5 as illustrated in FIG. 11, the effect of diffusing and absorbing the local lateral pressure can be efficiently realized particularly in the case when the lateral pressure acts locally on a composite cable 31. Therefore, it efficiently obtains such an effect as makes the local lateral pressure hard to influence. The same effect that the composite cable 31 illustrated in FIG. 11 is promising by making an air space 44 have such a curved shape in its cross-sectional shape that the lateral face thereof, which faces the lateral face 5a of the overall sheath 5 in the thickness direction, bulges out in a half-moon shape or a half-ellipsoid toward the lateral face 5a of the overall sheath 5 as illustrated in FIG. 12.

Embodiment 8

Figure 13:
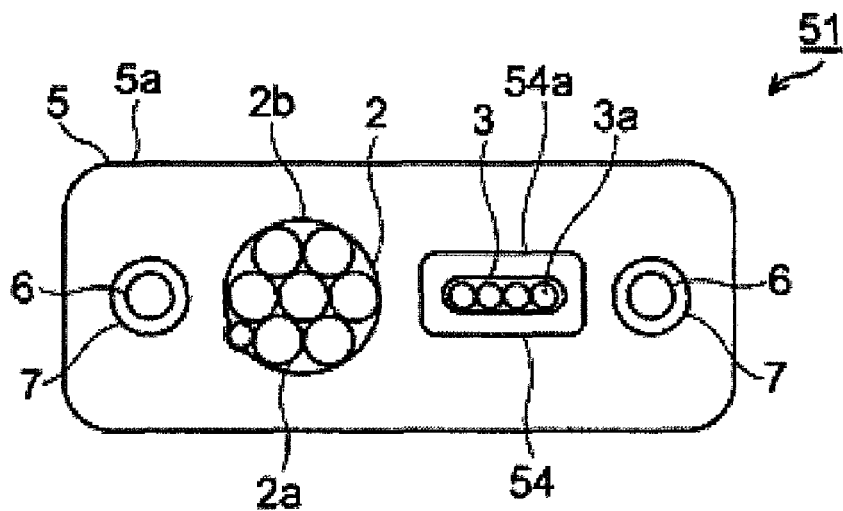
FIG. 13 is a sectional view of an example of modification of the composite cable of Embodiment 8 of the present invention.

FIG. 13 is a sectional view of the composite cable of Embodiment 8 of the present invention.

A composite cable 51 illustrated in FIG. 13 has a different construction from that of Embodiment 7 illustrated in FIG. 9 with respect only to the construction of an airspace formed in an overall sheath 5. Therefore, those explanations in Embodiment 7 of the present invention illustrated in FIG. 9 that will be commonly applicable to this embodiment are omitted; and only those aspects different from Embodiment 7 are explained hereunder referring to FIG. 13.

A composite cable 51 illustrated in FIG. 13 is provided with an airspace 54 having an approximately oblong-shape of rectangular section, which is formed around an optical fiber ribbon 3 enveloping the same. In FIG. 13, the airspace 54 is provided so that the distance between a lateral face 5a of an overall sheath 5 perpendicular to the thickness direction thereof and a lateral face 54a of the airspace 54 facing the lateral face 5a will be longer than the shortest distance between a periphery 2b of a stranded wire 2, which is the surface thereof, and the lateral face 5a of the overall sheath 5. However, similarly to the configuration illustrated in FIG. 9, the airspace 54 may be formed so that the position of the lateral face 54a of the airspace 54 facing the lateral face 5a of the overall sheath 5 will cause the distance between the lateral face 54a and the lateral face 5a of the overall sheath 5 to be shorter than the shortest distance between the periphery 2b of the stranded wire 2, which is the surface thereof, and the lateral face 5a of the overall sheath 5.

This embodiment offers an effect such that providing the airspace 54 as illustrated in FIG. 13 in the composite cable 1 illustrated in FIG. 10 prevents effect on an optical fiber 3a when a lateral pressure is impressed from outside over or locally on one lateral face of the overall sheath 5, which face is perpendicular to the thickness direction thereof; this means that increase of transmission loss due to bend of the optical fiber 3a is prevented. It further offers another effect such that an elongation of the optical fiber 3a will be lightened with the increase in bending loss suppressed particularly in the case when the composite cable 51 is to be terminated on the on-device connector or is bent while installation, since the airspace 54 is formed around the optical fiber ribbon 3.

Figure 14:
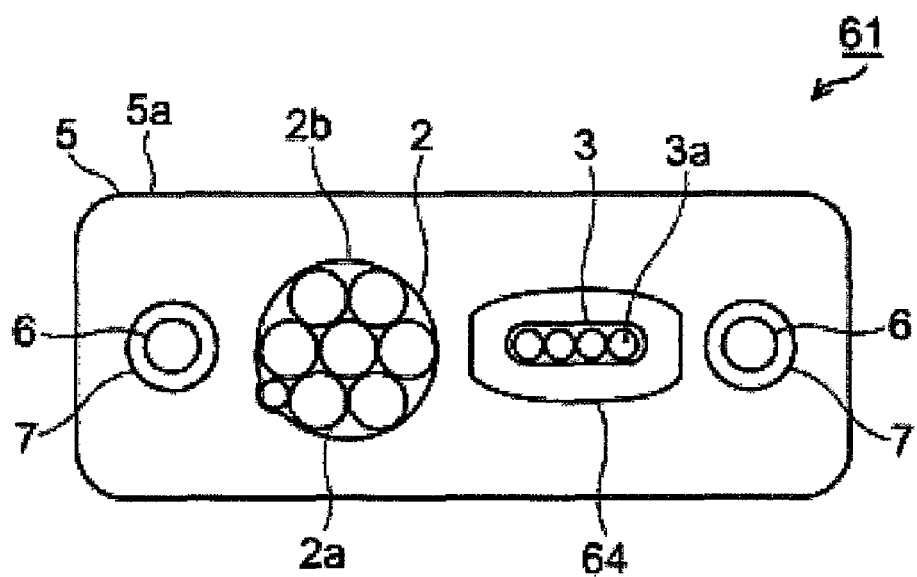
FIG. 14 is a sectional view of another example of modification of the composite cable of Embodiment 8 of the present invention.
Figure 15:
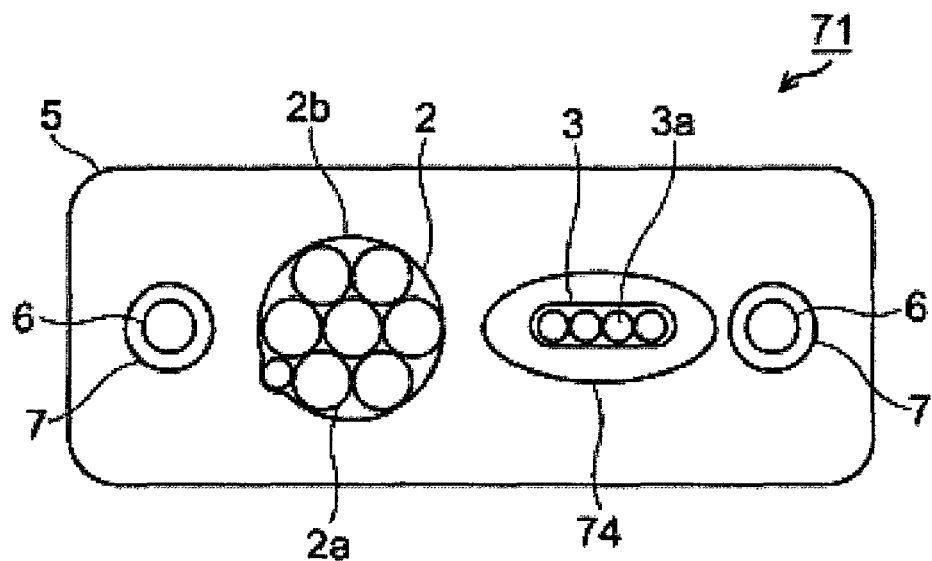
FIG. 15 is a sectional view of further another example of modification of the composite cable of Embodiment 8 of the present invention.

FIGS. 14 and 15 are sectional views of examples of modification of the composite cable 51 illustrated in FIG. 13.

In the composite cable 51 in Embodiment 8 of the present invention illustrated in FIG. 13, the airspace 54, which was formed around the optical fiber ribbon 3 enveloping the same, was given an approximately oblong shape of rectangular section. However, as illustrated in FIG. 14 or FIG. 15, the face (the lateral face of the airspace 54 perpendicular to the thickness direction thereof) facing the lateral face 5a of the overall sheath 5, which is perpendicular to the thickness direction thereof (vertical direction across the cross section illustrated in FIGS. 14 and 15), may be such airspaces 64 or 74 as has a curved shape in cross section such as a bent, a half-moon, or half-ellipsoid.

By making the airspace 64 have such a curved shape in its cross-sectional feature that the lateral face thereof facing the lateral face 5a of the overall sheath 5, which is perpendicular to the thickness direction thereof, bulges out (curves out) toward the lateral face of the overall sheath 5 as illustrated in FIG. 14, the effect of diffusing and absorbing the local lateral pressure can be efficiently realized particularly in the case when the lateral pressure acts locally on a composite cable 61. Therefore, it efficiently obtains such an effect as makes the local lateral pressure hard to influence. The same effect that the composite cable 61 illustrated in FIG. 14 is promising by making an air space 74 have such a curved shape in its cross-sectional shape that the lateral face thereof, which faces the lateral face 5a of the overall sheath 5, bulges out in a half-moon shape or a half-ellipsoid toward the lateral face 5a of the overall sheath 5 as illustrated in FIG. 15.

Figure 16:
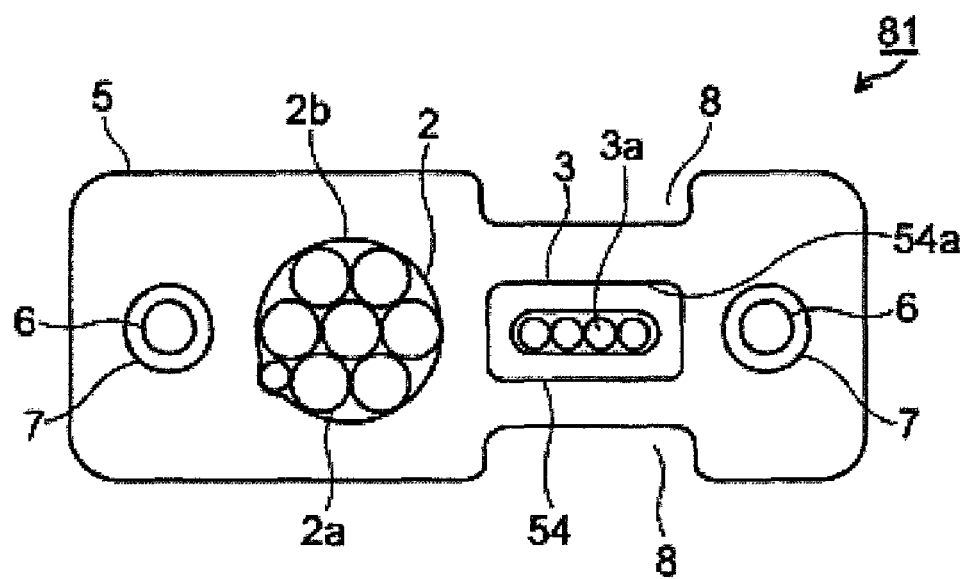
FIG. 16 is a sectional view of still further another example of modification of the composite cable of Embodiment 8 of the present invention.

FIG. 16 is a sectional view of an example of modification of the composite cable illustrated in FIG. 13.

A composite cable 81 illustrated in FIG. 16 is such a composite cable that a concave portion 8 having a concave-groove is provided on the lateral face 5a of the overall sheath 5, which is perpendicular to the thickness direction of the overall sheath 5, in the composite cable 51 illustrated in FIG. 13. It is preferable that the concave portion 8 should be provided at least one of the lateral faces 5a of the overall sheath 5.

The concave portion 8 should be formed preferably on a position where the bottom of the concave on the lateral face 5a of the overall sheath 5 faces the lateral face 54a of the airspace 54, which is perpendicular to the thickness direction of the airspace 54, that is, on a position where the bottom of the concave faces the optical fiber ribbon 3.

This embodiment provides the same effect as in the Embodiment 1 because the concave portion 8 is formed on the lateral face of the overall sheath 5 that is perpendicular to the thickness direction of the of the overall sheath 5. This means that having a look at the external view of the composite cable 81 permits to locate the optical fiber ribbon 3. In the composite cable 81, it can be prevented that the transmission loss of the optical fiber 3a would increase due to bending caused by a lateral pressure when the lateral pressure acts on the lateral face 5a of the overall sheath 5 that is perpendicular to the thickness direction (vertical direction across the cross section illustrated in FIG. 16) of the overall sheath 5. Thus, the synergetic effect with the effect of the airspace 54 enables to suppress more effectively the increase in the transmission loss due to lateral pressure.

Although the airspace 54 having an approximately oblong-shape of rectangular section was employed in combination with the concave portion 8 in the composite cable 91 illustrated in FIG. 16, the modes of implementing is not limited to this combination. For example, it is feasible to form the concave portion 8 on at least one of the lateral faces 5a of the overall sheath 5 in the composite cables 61 and 71 illustrated in FIGS. 14 and 15.

Figure 17:
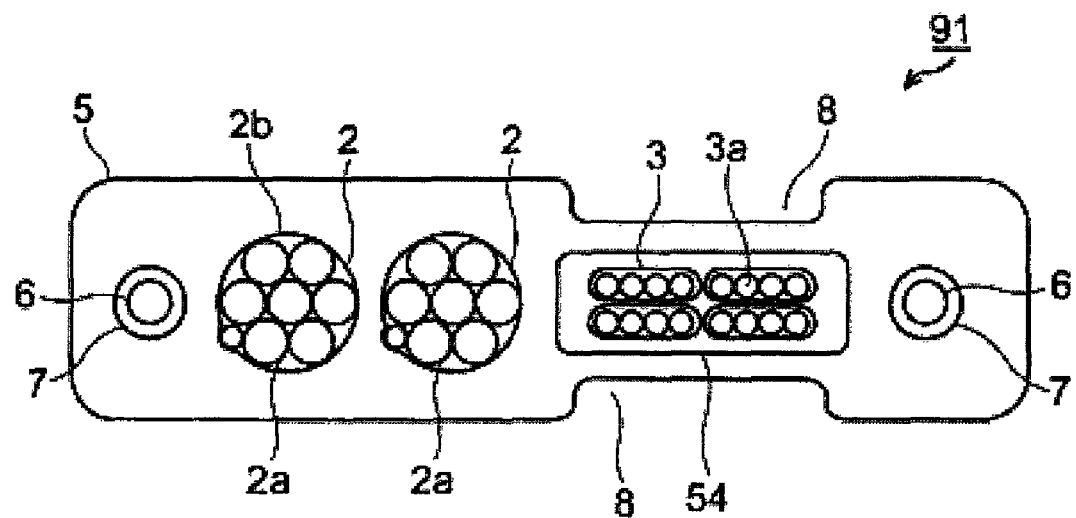
FIG. 17 is a sectional view of more another example of modification of the composite cable of Embodiment 8 of the present invention.

FIG. 17 is a sectional view of an example of modification of the composite cable 81 illustrated in FIG. 16.

A composite cable 91 illustrated in FIG. 17 is such a composite cable that the stranded wire 2 and the optical fiber ribbon 3 in the composite cable 81 illustrated in FIG. 16 are arranged respectively in the plural number. With respect to arrangement of the stranded wire 2 and the optical fiber ribbon 3 in this embodiment, an example would be such that as illustrated in FIG. 17. In the arrangement example illustrated, an optical fiber ribbon group comprised of: a pile of two optical fiber ribbons 3 disposed in parallel arrangement in the width direction of the overall sheath 5 and another two optical fiber ribbons 3 disposed in the same manner stacked in the thickness direction of the overall sheath 5, and a stranded wire group comprised of two stranded wires 2 disposed in parallel arrangement in the width direction of the overall sheath 5, are arrayed in a parallel arrangement in the width direction of the overall sheath 5. Practicable arrangements however are not limited to this explanatory example. Variations or modifications in the implementing details of the number of the stranded wire 2 or the optical fiber ribbon 3 and positional arrangement thereof may be feasible depending on the place of installation or usage, etc.

The composite cable 91 illustrated in FIG. 17 has the concave portion 8 on the lateral face 5*a* of the overall sheath 5 that is perpendicular to the thickness direction of the overall sheath 5 as illustrated in FIG. 16. The concave portion 8 however may be omitted as in the composite cable 51 illustrated in FIG. 13.

In the composite cable of Embodiment 8 as illustrated in FIG. 16, the stranded wire 2 and the optical fiber ribbon 3 are arranged respectively in the plural number. However, it is also feasible to arrange the stranded wires 2 and the optical fiber ribbons 3, respectively in the plural number, in the composite cables of Embodiment 7 as illustrated in FIGS. 9 to 12 for example.

As stated above, it is feasible in Embodiment 7 and Embodiment 8 of the present invention to arrange the stranded wires 2 and the optical fiber ribbons 3 therein respectively in the plural number.

Figure 18:
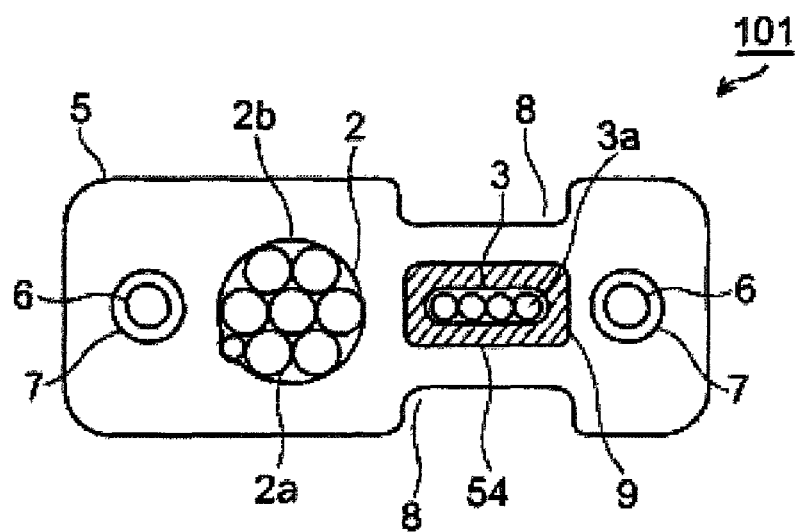
FIG. 18 is a sectional view of furthermore another example of modification of the composite cable of Embodiment 8 of the present invention.
Figure 19:
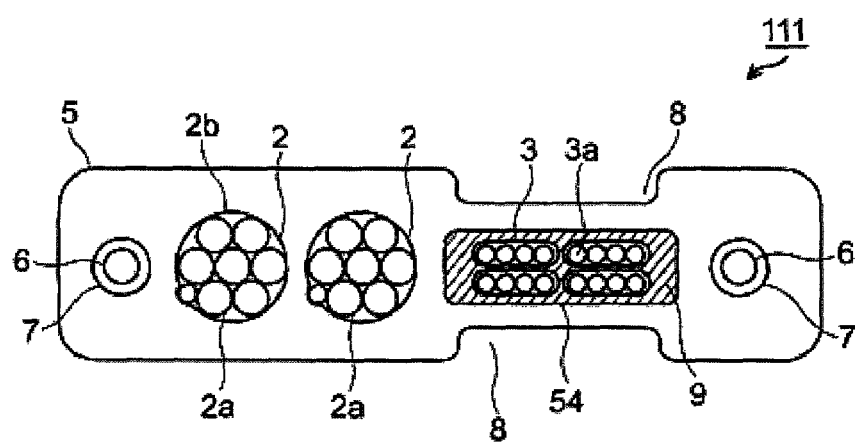
FIG. 19 is a sectional view of still more another example of modification of the composite cable of Embodiment 8 of the present invention.
Figure 20:
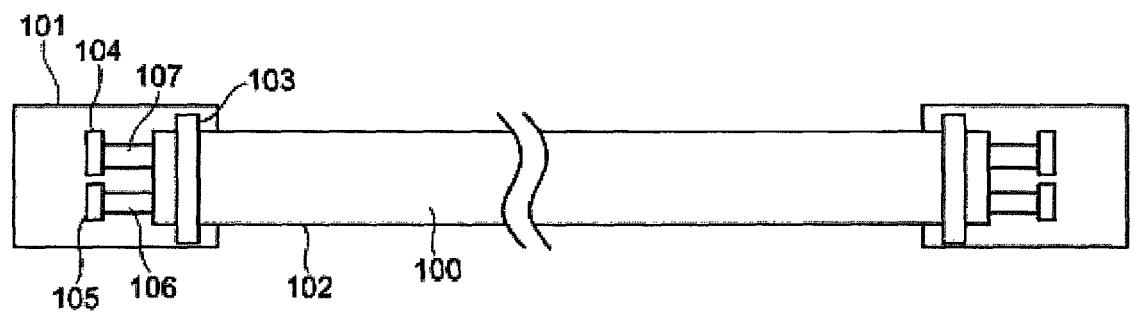
FIG. 20 is an illustration that exhibits the state of the composite cable of which end is secured on a connector.

FIGS. 18 and 19 are a sectional view of examples of modification of the composite cable 81 illustrated in FIG. 16.

A composite cable 101 illustrated in FIG. 18 is such a composite cable that a cushioning material 9 like Kevlar is provided inside the airspace 54 in the composite cable 81 illustrated in FIG. 16.

Providing the cushioning material 9 inside the airspace 54 offers such an effect that the optical fiber 3*a* is prevented from being bent by a lateral pressure, including a locally acting lateral pressure like a situation as illustrated in FIG. 10, impressed from the outside of the composite cable 101. Such configuration further offers another effect such that the increase in bending loss is more effectively suppressed since the stress of the optical fiber 3*a* is relaxed by the cushioning material 9 particularly in the case when the composite cable 101 is bent while termination on the on-device connector or installation. As for the cushioning material 9, other material that provides equivalent effects may be optionally selected without being limited to Kevlar.

As illustrated in FIG. 19 alternatively, it may be feasible to configure a composite cable 111 by arranging the stranded wire 2 and the optical fiber ribbons 3 respectively in the plural number in the composite cable 101 having the cushioning material 9 comprised of such as Kevlar inside the airspace 54.

The composite cables 101 and 111 illustrated respectively in FIGS. 18 and 19 severally has the concave portion 8 on the lateral face 5*a* of the overall sheath 5. The concave portion 8 however may be omitted as in the composite cable 51 illustrated in FIG. 13.

The example described here had such a construction that a cushioning material was provided inside the airspace of the composite cable of Embodiment 8 as illustrated in FIG. 16. However, it may be feasible to provide a cushioning material, comprised of such as Kevlar, inside the airspace of the composite cable of, for example, Embodiment 7 as illustrated in FIGS. 9 to 12.

As mentioned above, the modes of embodiments of the present invention were explained. However, the above-stated modes of embodiments of the present invention are not to give any limitation over the scope of the claimed invention. Further, it should be understood that not all the combinations of features appeared in explaining each of the embodiments are essential conditions for means for solving the problems in the object of the present invention.

The invention claimed is:

1. A composite cable, comprising a stranded wire that is a strand of a plurality of insulated conductors each of which is a conductor with insulation covering thereon, an optical fiber ribbon that has a plurality of optical fibers parallelly-arranged in a row, and an overall sheath that covers said stranded wire and said optical fiber ribbon in a bundle, wherein said composite cable has a deterrent positioned on outer side of said stranded wire and said optical fiber ribbon parallelly-arranged in a row along the width direction of said overall sheath for deterring expansion and shrinkage of said overall sheath, wherein said deterrent has a patterned indented shape on the surface thereof.

2. A composite cable according to claim 1, wherein said patterned indented shape is such a shape as is defined by an alternate array of a thick-portion and a thin-portion formed on said deterrent along the longitudinal direction thereof.

3. A composite cable according to claim 1, wherein said patterned indented shape is such a shape as is defined by a spiral groove formed on said deterrent over the longitudinal direction thereof.

4. A composite cable according to claim 1, wherein a cushioning material is arranged around said optical fiber ribbon.

5. A composite cable according to claim 1, wherein said overall sheath has a concave portion formed with concave-groove on at least one of the two lateral faces of said overall sheath facing each other, each of which faces is perpendicular to the thickness direction of said overall sheath.

6. A composite cable according to claim 5, wherein said concave portion is formed on a position where the bottom of said concave portion faces said optical fiber ribbon.

7. A composite cable according to claim 1, wherein said stranded is be disposed on both sides of said optical fiber ribbon, being centered thereat, in the number at least one on the one side thereof.

8. A composite cable according to claim 1, wherein an optical fiber ribbon group composed of a plurality of optical fiber ribbons arranged in the width direction or in the thickness direction, or both directions, of said overall sheath and a stranded wire group comprised of a plurality of stranded wires parallelly-arranged in a row in the width direction of said overall sheath are disposed parallelly in the width direction of said overall sheath.

9. A composite cable according to claim 8, wherein said optical fiber ribbon group is made thinner in thickness than the diameter of said stranded wire.

10. A composite cable according to claim 1, wherein said overall sheath has an airspace between at least one of the two lateral faces of said overall sheath facing each other, each of which faces is perpendicular to the thickness direction of said overall sheath, and said optical fiber ribbon.

11. A composite cable according to claim 10, wherein said airspace is formed around said optical fiber ribbon so that said airspace will envelope said optical fiber ribbon.

\* \* \* \* \*